No. 650,495. Patented May 29, 1900.
E. S. SPENCER.
APPARATUS FOR WASHING GRAIN.
(Application filed Aug. 7, 1899.)
(No Model.) 2 Sheets—Sheet 1.
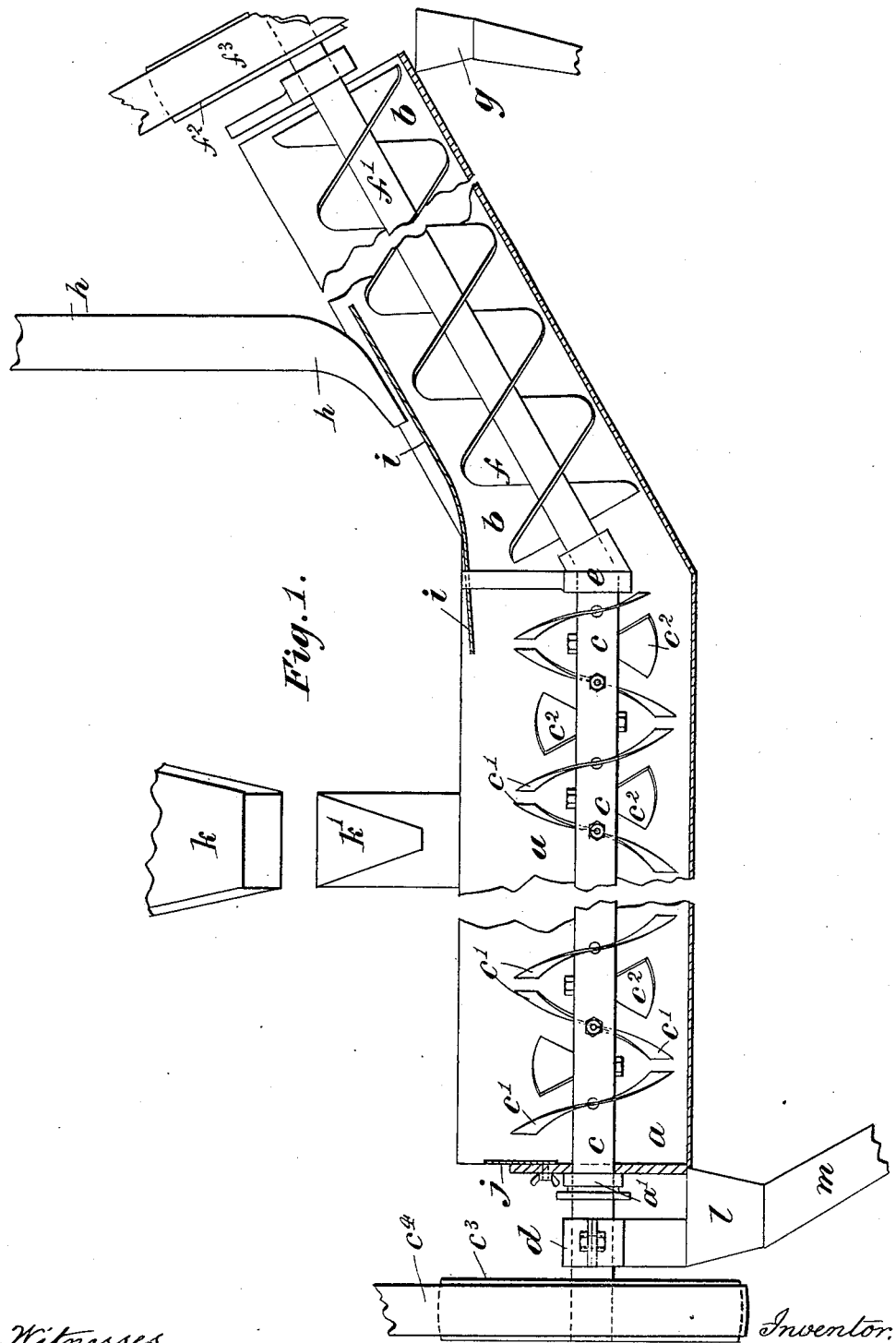

No. 650,495. Patented May 29, 1900.
E. S. SPENCER.
APPARATUS FOR WASHING GRAIN.
(Application filed Aug. 7, 1899.)
(No Model.) 2 Sheets—Sheet 2.
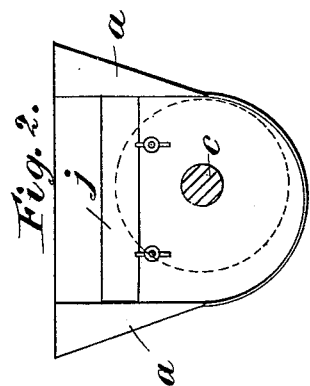
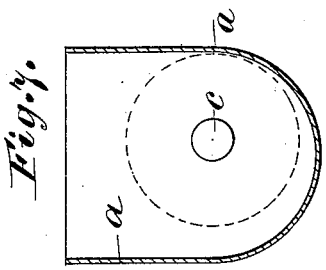
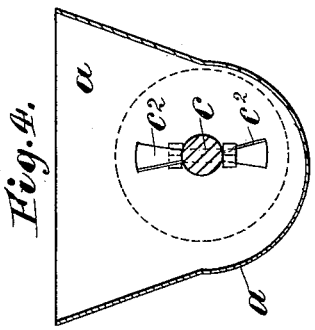
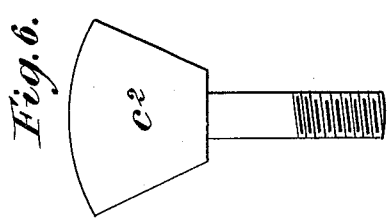
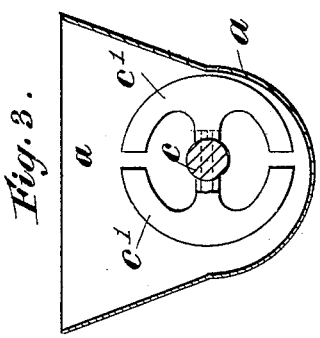
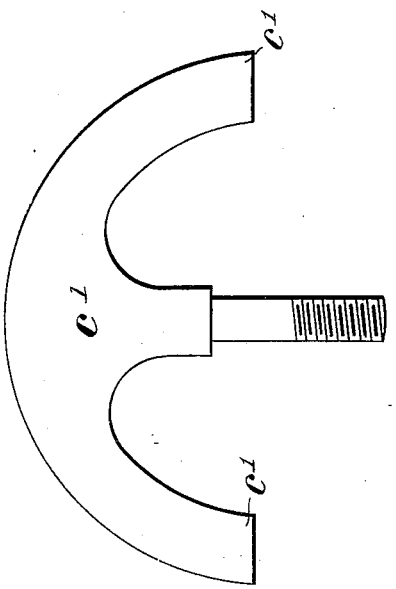
Witnesses.
Inventor.
Ernest Samuel Spencer,
by Wm. H. Finckel, Atty.
THE NORRIS PETERS CO., PHOTO-LITHO., WASHINGTON, D. C.

UNITED STATES PATENT OFFICE.

ERNEST S. SPENCER, OF LONDON, ENGLAND.

APPARATUS FOR WASHING GRAIN.

SPECIFICATION forming part of Letters Patent No. 650,495, dated May 29, 1900.

Application filed August 7, 1899. Serial No. 726,438. (No model.)

*To all whom it may concern:*

Be it known that I, ERNEST SAMUEL SPENCER, a subject of the Queen of Great Britain, residing at London, England, have invented a new and useful Apparatus for Washing Grain, of which the following is a full, clear, and exact description, and for which I have made applications for patents in Great Britain, No. 14,114, dated July 8, 1899, and No. 14,375, dated July 12, 1899.

The object of this invention is to provide an apparatus for washing grain; and I will first describe my invention as applied to the separation of the germ from crushed maize or Indian corn. Whole maize or Indian corn is first crushed and then sieved to obtain an even grade. The meal and small-grade stuff are thereby removed from the larger-grade particles.

My invention consists in an apparatus comprising a trough through which the remaining larger-grade particles are passed, means arranged above said trough for supplying a current of water thereto flowing in one direction, and means arranged in said trough for gradually conveying the crushed maize in a direction opposite or contrary to that in which the water flows, whereby the crushed maize is well roused while under treatment in the water, and the invention also comprises means for maintaining the water at a suitable level in the trough.

In the accompanying drawings, illustrating my invention, in the several figures of which like parts are similarly designated, Figure 1 is a longitudinal section of the apparatus. Fig. 2 is a sectional end view of Fig. 1. Fig. 3 is a cross-section of Fig. 1, showing one pair of crescent-shaped conveyer-blades in the horizontal trough. Fig. 4 is a cross-section of Fig. 1, showing one pair of blades to assist in the suspension of the germ and lighter particles, as well as to assist in the flow of the water and of the germs or lighter particles carried thereby in a contrary direction to that of the crushed maize. Figs. 5 and 6 are separate views of one of each of said blades, and Fig. 7 is a cross-section of a modified form of trough.

In carrying my invention into effect I employ a trough $a$, which is fixed in a horizontal position and is preferably of smaller section at the lower part than at the upper part thereof. At one end of this trough $a$ and communicating therewith I arrange an inclined trough $b$. At the lower part of the horizontal trough $a$ is arranged a conveyer, preferably formed of a number of crescent-shaped blades $c'$, fixed to a shaft $c$, passing at one end through a stuffing-box $a'$ and journaled in bearings $d$ $e$. Between these crescent-shaped blades $c'$ I preferably arrange other blades $c^2$, which are also fixed to the shaft $c$ to assist in the suspension of the germ and lighter particles, as well as to assist in the flow of the water and of the germs and lighter particles carried by the water in a contrary direction to that of the crushed maize. The inclined trough $b$ has a screw or other conveyer $f$ to carry the germ-freed crushed maize out of the water and to drain the same, finally delivering it to a suitable chute $g$.

The water is admitted by a pipe $h$, arranged above and at that end of the horizontal trough $a$ which adjoins the inclined trough $b$, and a plate $i$ is fixed over the meeting ends of the conveyers $c$ $c'$ $f$ to receive the water from the pipe $h$ and to spread and direct it toward the overflow. This plate $i$ also prevents any disturbance by the incoming water of the germ-freed crushed maize near the point where it is being delivered to the inclined trough $b$ and conveyer $f$. At the overflow end of the horizontal trough $a$ is mounted an adjustable slide $j$, whereby the height of the overflow can be adjusted.

A chute $k$ and hopper $k'$ to supply the crushed maize to the horizontal trough $a$ are arranged at a suitable point along the length of the latter. The conveyer-shaft $c$ is driven by means of a belt $c^4$, passing around a pulley $c^3$, fixed on said shaft $c$, and the worm $f$ is driven by a belt $f^3$, passing around a pulley $f^2$, fixed on the shaft $f'$ of said conveyer. Other means of driving said conveyers may, however, be adopted.

The overflow-water from the trough $a$ and the germs carried thereby are received by the hopper $l$, whence they are conveyed by the pipe $m$ to any suitable receiver.

The operation of the apparatus is as follows: Water and crushed maize are supplied to the horizontal trough $a$. The water-flow is directed toward the overflow-end of said trough $a$. The crushed maize is conveyed by the conveyer-blades $c'$ in a contrary direction to that of the flow of the water toward the inclined conveyer, which latter raises the germ-freed crushed maize from the water and allows the main part of the latter to drain therefrom. The blades $c^2$ assist to separate the germ and lighter particles from the crushed maize. The germs and other light particles are thus separated from the crushed maize.

The speed of the conveyers and the flow of water may be varied according to circumstances.

Although in the above description I have referred only to the degerming of maize, it will be evident that the invention is equally applicable to the washing of grain and to making separations therefrom.

In separating or sizing wheat, barley, beans, or other cereals it is only necessary to regulate the quantity and flow of water to suit requirements where the lighter grain can be carried with the water, while the heavier grain travels with the worm in the opposite direction.

Having fully described my invention, what I claim, and desire to secure by Letters Patent, is—

1. In an apparatus for washing grain, the combination of a horizontal trough, means for feeding the grain to said trough, means arranged above said trough at the discharge end thereof for supplying a current of water, flowing in one direction, to said trough, a conveyer mounted in said trough and adapted to give motion to the grain in a direction contrary to that in which the water flows, agitators carried by the said conveyer-shaft, an inclined trough communicating with the discharge end of the horizontal trough, and a conveyer in said inclined trough to raise the grain out of the water and drain the same, substantially as herein set forth.

2. The combination of a horizontal trough, means for feeding grain thereto, means for supplying a current of water to said trough, a conveyer mounted in said trough giving motion to the grain in a direction contrary to that in which the water flows, agitators carried by the shaft of said conveyer, an inclined trough communicating with the discharge end of the horizontal trough, a conveyer in said inclined trough to raise the grain out of the water and drain the same, and a guard arranged beneath the water-supply and over the meeting ends of said troughs to prevent the incoming water from disturbing the washed grain and to spread and direct the water toward the overflow end of the horizontal trough, substantially as herein set forth.

3. In apparatus for washing grain, the combination of a horizontal trough, means for feeding crushed maize or grain to said trough, means for supplying water to said trough, a conveyer mounted in said trough giving motion to the crushed maize or grain in a contrary direction to that in which the water flows, agitators carried by the said conveyer-shaft, an inclined trough communicating with the grain-discharge end of the horizontal trough, a conveyer in said inclined trough to raise the grain out of the water and drain the same, a guard over the meeting ends of the horizontal and inclined troughs to prevent the incoming water from disturbing the germ-freed maize or washed grain and to spread and direct the water toward the overflow, and an adjustable plate at the overflow end of the horizontal trough to regulate the height of the overflow, substantially as herein set forth.

In testimony whereof I affix my signature in presence of two witnesses.

ERNEST S. SPENCER.

Witnesses:
B. J. B. MILLS,
CLAUDE K. MILLS.